(12) United States Patent
Loebinger

(10) Patent No.: US 9,807,948 B2
(45) Date of Patent: Nov. 7, 2017

(54) DRIP IRRIGATION TUBE WITH METERING ELEMENTS INSERTED THEREIN

(71) Applicant: THE Machines Yvonand S.A., Yvonand (CH)

(72) Inventor: Ahai Loebinger, Yvonand (CH)

(73) Assignee: THE MACHINES YVONAND S.A., Yvonand (CH)

( * ) Notice: Subject to any disclaimer, the term of this patent is extended or adjusted under 35 U.S.C. 154(b) by 22 days.

(21) Appl. No.: 14/872,528

(22) Filed: Oct. 1, 2015

(65) Prior Publication Data
US 2016/0095285 A1    Apr. 7, 2016

(30) Foreign Application Priority Data
Oct. 2, 2014    (EP) ..................... 14187499

(51) Int. Cl.
*B05B 15/00*    (2006.01)
*A01G 25/02*    (2006.01)
*B05B 15/06*    (2006.01)

(52) U.S. Cl.
CPC ........... *A01G 25/023* (2013.01); *A01G 25/02* (2013.01); *B05B 15/008* (2013.01); *B05B 15/069* (2013.01)

(58) Field of Classification Search
CPC .... A01G 25/023; A01G 25/02; B05B 15/069; B05B 15/008
USPC ................. 239/145, 542, 547, 575
See application file for complete search history.

(56) References Cited

U.S. PATENT DOCUMENTS

| | | | |
|---|---|---|---|
| 5,586,727 A | 12/1996 | Shekalim | |
| 5,634,594 A * | 6/1997 | Cohen | G05D 7/0113 239/542 |
| 7,681,810 B2 * | 3/2010 | Keren | A01G 25/023 239/542 |
| 2006/0237561 A1 | 10/2006 | Park et al. | |
| 2013/0248616 A1 | 9/2013 | Ensworth et al. | |

FOREIGN PATENT DOCUMENTS

EP    0636309 A1    2/1995

OTHER PUBLICATIONS

Extended European Search Report for related European Application No. 14187499.0, dated Apr. 13, 2015 (10 pages).

* cited by examiner

*Primary Examiner* — Steven J Ganey
(74) *Attorney, Agent, or Firm* — Dorsey & Whitney LLP

(57) ABSTRACT

A drip irrigation tube is provided with metering elements comprising respectively inlet regions, through which the water in the tube arrives in the metering elements, metering regions, formed by a labyrinth channel, which is delimited by two lateral walls, a cover and the walling of the drip irrigation tube and in which a pressure reduction of the water flowing through takes place, and outlet regions, through which the water emerges out of the drip irrigation tube via outlet openings made in the tube walling. The respective outlet region borders at least on one lateral wall, of the labyrinth channel; at least one region of this lateral wall is covered by an elastic membrane forming a portion of the cover, so that the lateral wall is able to be lifted off of the tube wall by means of the elastic membrane and forms a passage through which the water from the labyrinth channel arrives directly in the outlet region. The water flowing through the metering element can thereby be metered depending upon the water pressure in the drip irrigation tube.

11 Claims, 16 Drawing Sheets

DRIP IRRIGATION TUBE WITH METERING ELEMENTS INSERTED THEREIN

CROSS-REFERENCE TO RELATED APPLICATIONS

The present application claims priority to European Patent Application No. 14187499.0, entitled "Drip Irrigation Tube with Metering Elements Inserted Therein," filed Oct. 2, 2014. The disclosure of the above-referenced patent application is hereby incorporated by reference in its entirety herein.

FIELD OF THE PRESENT DISCLOSURE

The present invention relates to a drip irrigation tube with metering elements inserted therein, which are connected to the walling of the drip irrigation tube, which metering elements each comprise inlet regions, through which the water from the tube arrives in the metering elements, metering regions, formed in each case by a labyrinth channel, which is delimited by two lateral walls, a cover and the walling of the drip irrigation tube and in which a pressure reduction of the water flowing through takes place, and outlet regions, through which the water emerges out of the drip irrigation tube via outlet openings made in the tube walling.

BACKGROUND

Drip irrigation tubes of this kind are known in various designs. With such drip irrigation tubes a direct irrigation of plants is achieved. For this purpose at least one metering element can be installed in the tube in the region of each plant, through which metering element the water can emerge dropwise via an outlet opening and can irrigate the respective plant accordingly. With such drip irrigation tubes a very efficient and economical irrigation of plants can be achieved.

During the irrigation process the water in the drip irrigation tubes is under a certain pressure. In these drip irrigation tubes the metering elements are installed at a particular spacing apart from one another. In each of these metering elements there takes place in the metering region a pressure reduction of the water; the water escapes dropwise out of the drip irrigation tubes through the outlet openings. These drip irrigation tubes can have a great length. In the crops to be irrigated these drip irrigation tubes follow the unevenness or inclinations of the ground. Owing to the length of the drip irrigation tubes or respectively the differences in altitude to be overcome, a differing water pressure can occur in these drip irrigation tubes during the irrigation process. With the metering elements known from the state of the art there is the drawback that the same amount of water does not escape in all the metering elements over time, so that the individual plants are not irrigated equally. At places of the drip irrigation tube where the water pressure is high, more water thus escapes than at places where the water pressure in the drip irrigation tube is smaller, for the mentioned reasons.

Drip irrigation tubes are known that are provided with metering elements in which the labyrinth channel forming the metering region can be changed depending on the water pressure. For this purpose, with increase of the water pressure in the drip irrigation tube, the discharge cross section of the labyrinth channel is reduced, whereby a greater metering of the escaping water can be achieved at increased pressure in the tube. A narrowing of the discharge cross section of the labyrinth channel entails however the risk that the thus restricted discharge cross section can be clogged by soil particles located in the water. A clogging of a metering element can however have the consequence that the plants to be irrigated by means of this metering element can die. It is also not possible in a simple way to flush out a soiling or clogging of the metering element and to overcome the corresponding malfunction.

SUMMARY

The object of the present invention thus consists in designing the metering elements for drip irrigation tubes in such a way that the discharge of water out of the respective metering element remains as constant as possible with changing pressure of the water in the drip irrigation tube and an increased risk of clogging of these metering elements by soil particles located in the water can be kept small.

This object is achieved according to the invention in that the respective outlet region borders on at least one lateral wall of the labyrinth channel, in that at least one region of this lateral wall is covered and connected by an elastic membrane forming a portion of the cover, in that the lateral wall is able to be lifted off of the tube walling by means of the elastic membrane and a passage is created through which the water from the labyrinth channel reaches the outlet region directly.

It can be achieved with these metering elements that with minimal water pressure inside of the drip irrigation tube the labyrinth channels forming the metering region are able to be opened laterally so that the metering region is shortened, and the water is able to flow laterally out of the labyrinth channel directly into the outlet region. Only when the water pressure is high inside the drip irrigation tube is the water led over the entire length of the labyrinth channel, whereby here too the desired metering can be achieved. Also achieved by means of this solution is that the risk of clogging of the labyrinth channel by soil particles located in the water is not increased; the discharge cross section of the labyrinth channel is not reduced. An optimal mode of operation of these metering elements is thereby ensured during changing pressure conditions of the water inside the drip irrigation tube.

Preferably the inlet regions of the metering elements are provided with filters, whereby it should be prevented as much as possible that soil particles which can be located in the water reach the labyrinth channel.

Preferably the metering elements are made of one material, in particular an elastomer, which simplifies the manufacture of these metering elements.

Preferably projections and depressions are provided on the lateral walls to form the labyrinth, whereby an optimal pressure reduction is achieved and the metering elements can be manufactured in a simple way, for example by means of punching or stamping.

The two lateral walls forming the labyrinth channel can extend from the inlet regions over at least a portion of the length of the elastic membrane, they also can extend from the inlet regions over the whole length of the elastic membrane, which can be advantageous depending upon employment of the metering elements.

Another advantageous embodiment of the invention consists in that the labyrinth channel is disposed around the outlet region and has an outer lateral wall and an inner lateral wall. By means of the centrally disposed outlet region a compact construction of the metering elements is obtained.

Preferably the outer lateral wall of the labyrinth channel is connected to the tube walling and to the elastic membrane, and the inner lateral wall is connected to the elastic membrane and is able to be lifted off of the tube walling.

Achieved thereby is that with minimal pressure in the drip irrigation tube the water flowing through the metering region with lifted-off inner lateral wall from the tube walling is able to arrive directly into the centrally disposed outlet region.

A further advantageous embodiment of the invention consists in that the inner lateral wall is provided with protrusions protruding into the outlet region, which protrusions are disposed in a distributed way over the length of the inner lateral wall. The length of the labyrinth channel which is flowed through by the water is thereby able to be changed in stages.

Preferably the protrusions have a height decreasing from the inlet region toward the end of the labyrinth channel. In this way with decreasing pressure inside the drip irrigation tube the water first escapes at the protrusion into the outlet region having the lowest height.

Preferably the surface of the inner lateral wall directed toward the tube walling has an inclination toward the outlet region, whereby it is achieved that the elastic membrane is able to be bent in an optimal way.

BRIEF DESCRIPTION OF THE DRAWINGS

Embodiments of the invention will be explained more closely in the following, by way of example, with reference to the attached drawings.

DETAILED DESCRIPTION

Figure 1:
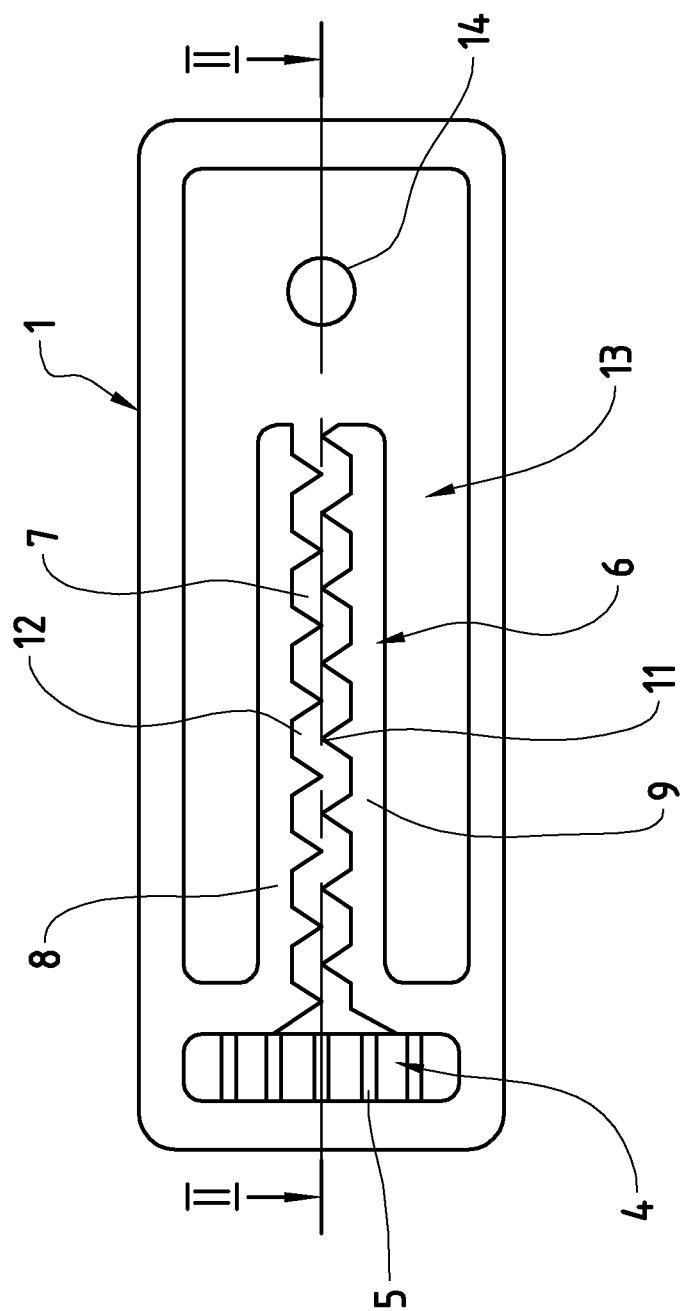
FIG. 1 is a sectional representation along line I-I of FIG. 4 of a first embodiment of a metering element of the facility according to the invention.

Visible in FIGS. 1 to 4 is a first embodiment of a metering element 1 which metering elements in a known way are inserted spaced apart from one another in a drip irrigation tube 2. These drip irrigation tubes 2 can be produced in a known way by means of an extrusion method. During this extrusion process the metering elements 1 are inserted in the formed tube 2 and are connected to the walling 3 of the drip irrigation tube 2.

Via an inlet region 4 the water reaches the metering element 1 out of the interior of the drip irrigation tube 2. The inlet region 4 is provided with filters 5 in a known way, shown only schematically, whereby soil particles which can be located in the water should be prevented from penetrating into the metering element 1. Via the inlet region 4 the water reaches a metering region 6, which is formed by a labyrinth channel 7. This labyrinth channel 7 is bounded by two lateral walls 8, 9, a cover 10 and the walling 3 of the drip irrigation tube 2. Provided on the lateral walls 8 and 9 are projections 11 and depressions 12, which form the labyrinth and by means of which a pressure reduction of the water flowing through takes place.

From the labyrinth channel 7 the water reaches an outlet region 13, from where the water can emerge out of the drip irrigation tube 2 and irrigate the corresponding plant via an outlet opening 14 made in the walling 3 of the drip irrigation tube 2.

As can be seen from FIG. 1 in particular, the outlet region 13 extends not only around the outlet opening 14, but also along the lateral walls 8 and 9 of the labyrinth channel 7.

Figure 2:
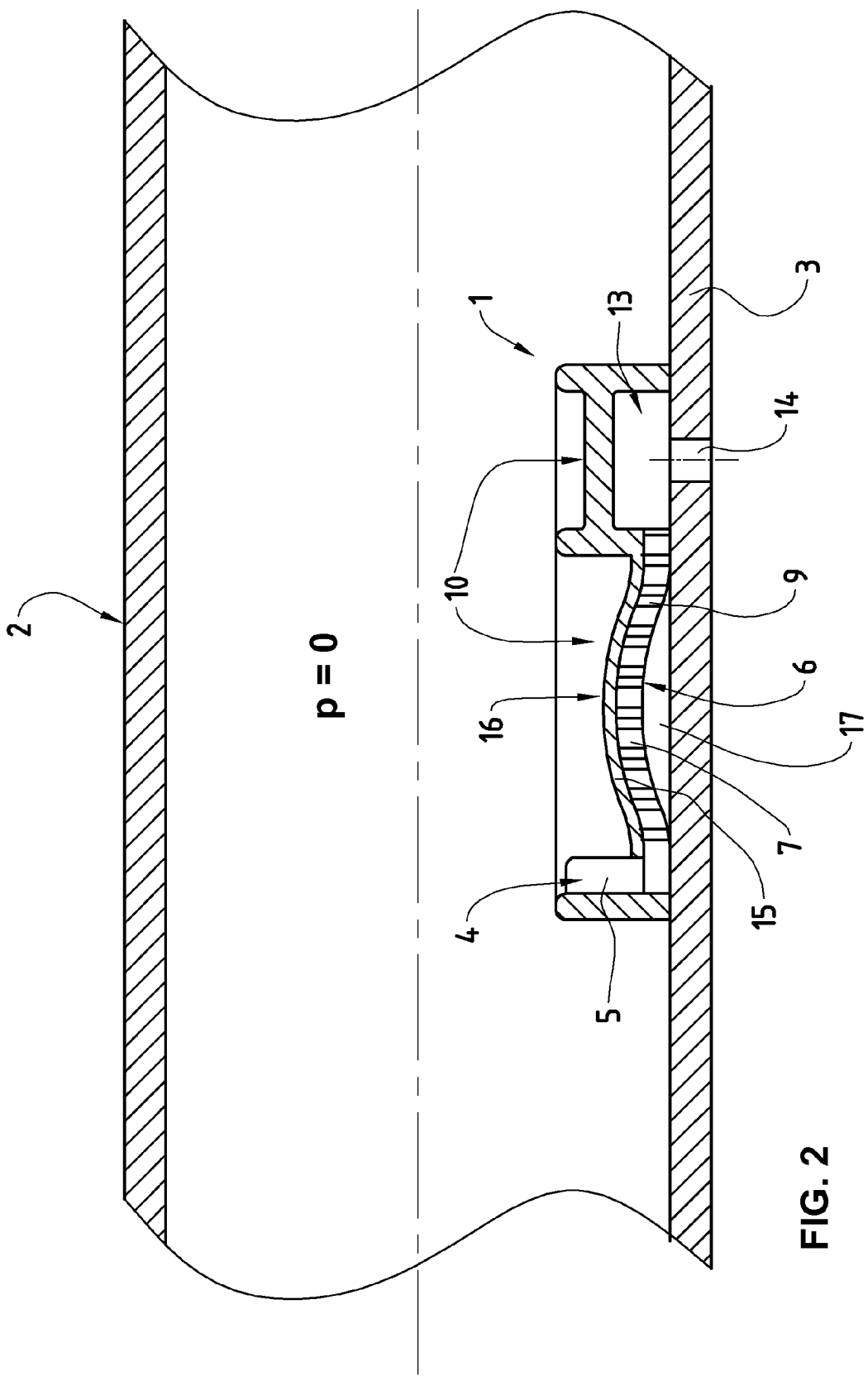
FIG. 2 to FIG. 4 are each sectional representations along line II-II of FIG. 1 of the first embodiment of the metering element according to FIG. 1, with in each case differing water pressure inside of the drip irrigation tube.
Figure 3:
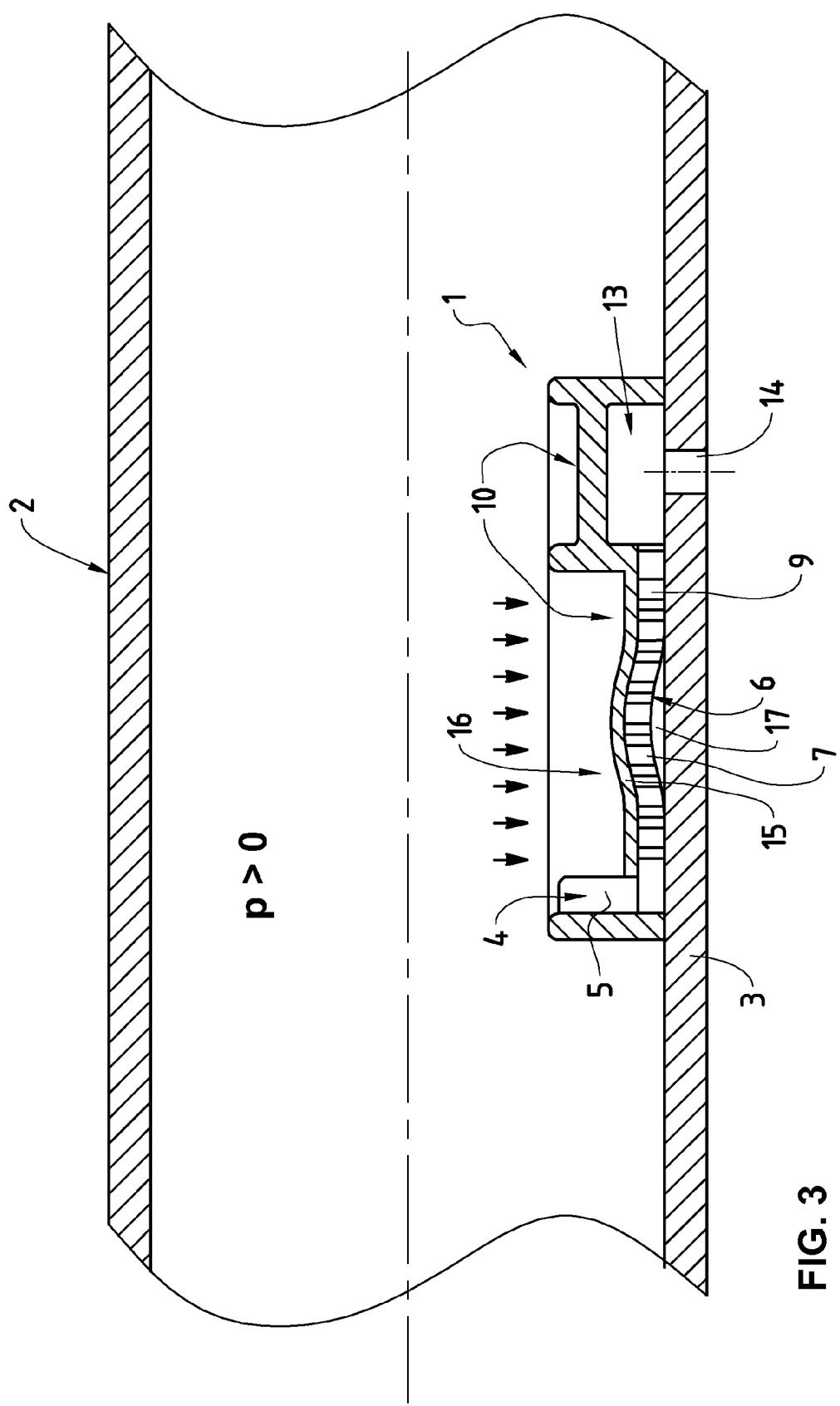
Figure 4:
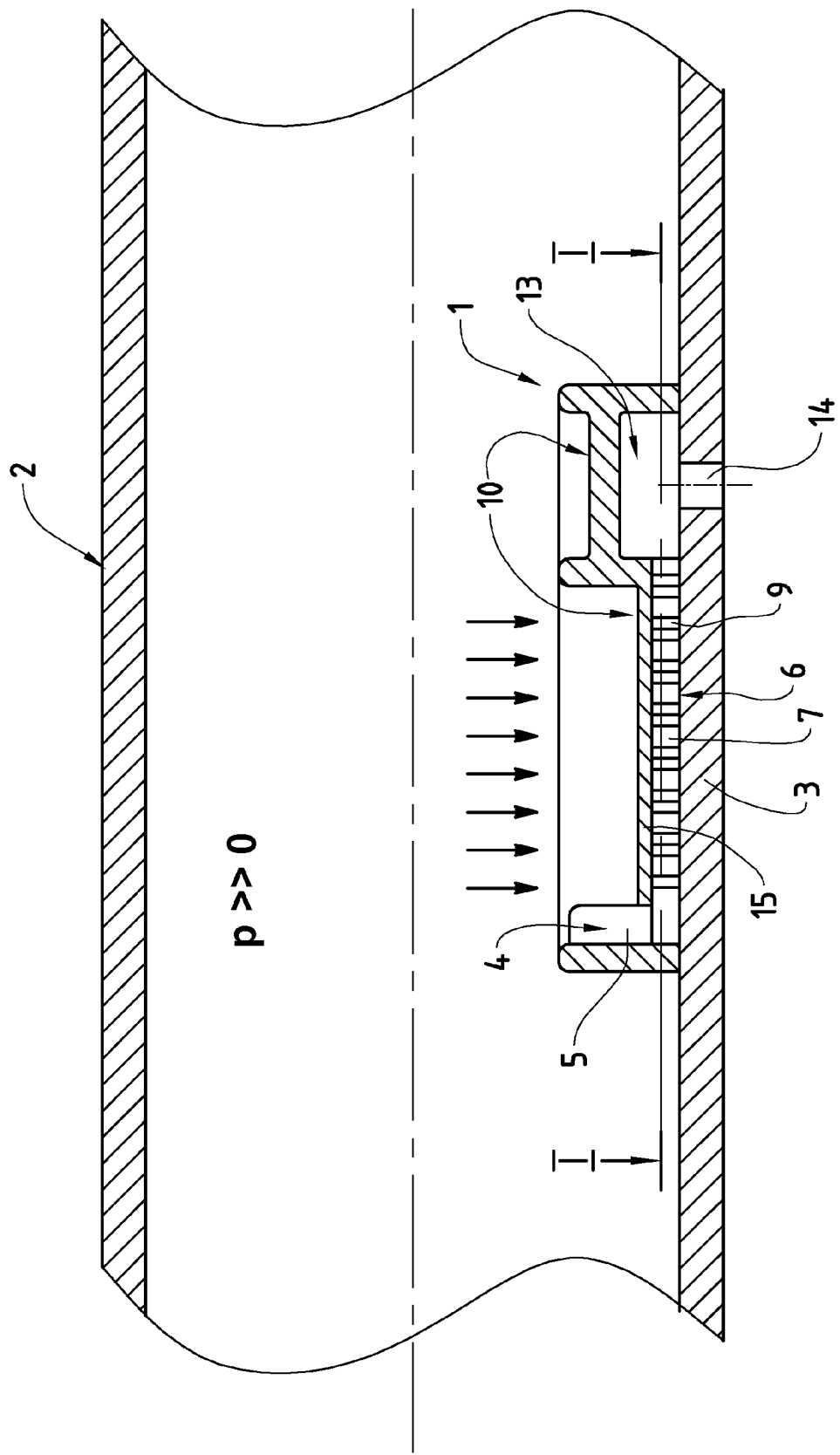
Figure 5:
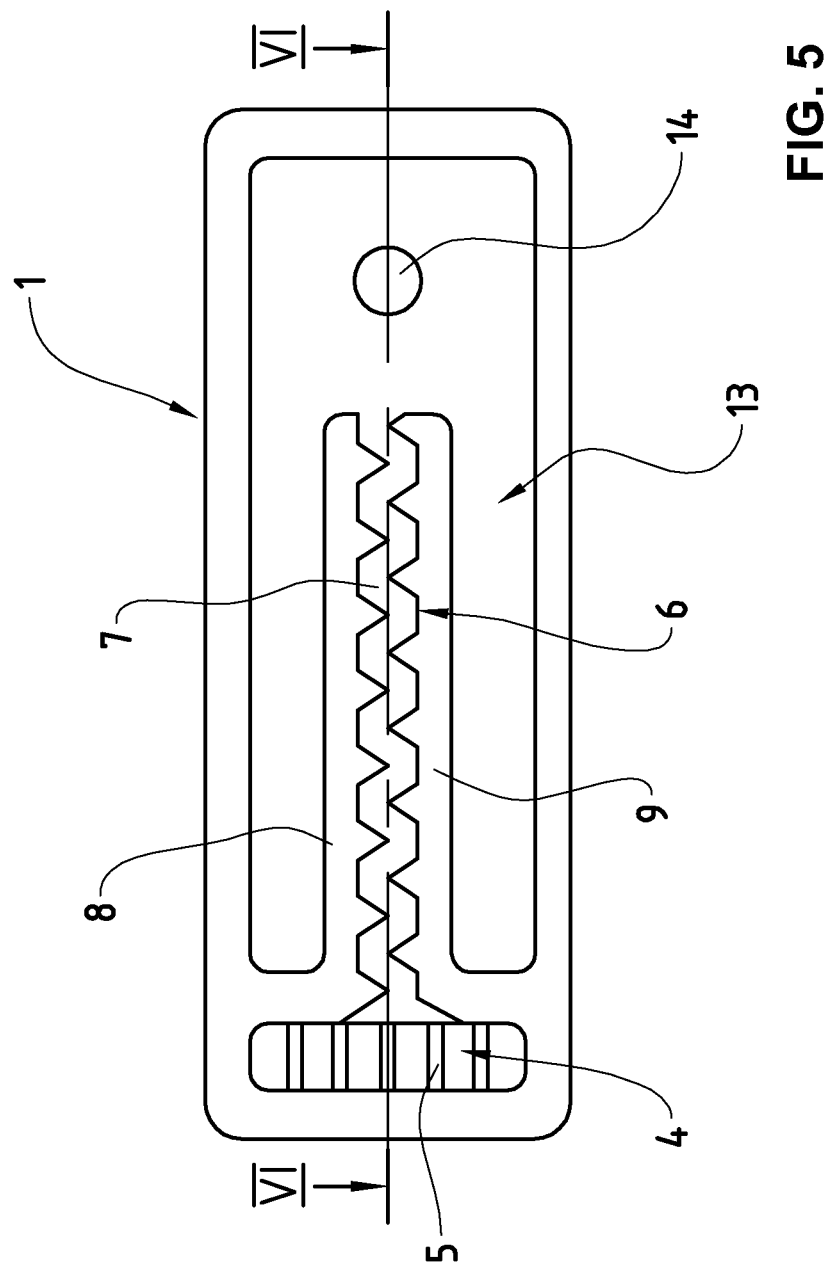
FIG. 5 is a sectional representation along line V-V of FIG. 8 of a second embodiment of a metering element of the facility according to the invention.

As can be seen from FIGS. 2 to 4, the cover 10 in the region of the labyrinth channel 7 consists of an elastic membrane 15. This elastic membrane 15 covers the entire width of the metering element 1 over the length of the labyrinth channel 7.

The elastic membrane 15 is designed in such a way that in unloaded state, i.e. when the water pressure inside the drip irrigation tube equals zero, it has a curve 16 directed toward the inside of the drip irrigation tube as can be seen in FIG. 2. Since the two lateral walls 8 and 9 are firmly connected with this elastic membrane 15, these walls in this state of the elastic membrane 15 are lifted up from the walling 3 of the drip irrigation tube 2, in particular in the central region, so that a passage 17 arises through which the water from the labyrinth channel 7 can flow directly into the outlet region 13 and out of the metering element 1 through the outlet opening 14.

When the water pressure inside the drip irrigation tube 2 increases and presses against the elastic membrane 15, as is shown in FIG. 3, the curve 16 of the elastic membrane moves toward the walling 3 of the drip irrigation tube 2, the two lateral walls 8 and 9 are pressed on the two end regions of the labyrinth channel 7 against the walling 3, the passage 17, through which the water can arrive directly in the outlet region 13 from the labyrinth channel 7, becomes smaller, and the water arriving in the outlet region is thus metered to a certain amount through the metering region 6.

When the water pressure inside the drip irrigation tube 2 increases further, as is shown in FIG. 4, the elastic membrane 15 and its curve 16 is pressed more forcefully against the walling 3 of the drip irrigation tube 2 in such a way that the two lateral walls 8 and 9 are pressed on the walling 3 over the entire length; the passages 17 shown in FIGS. 2 and 3 are completely closed. The water arriving in the metering region 6 flows through the complete length of the labyrinth channel 7 and then ends up in the outlet region 13. One thus achieves the full metering capacity of the metering element. Achieved through this design of the metering element 1 is that, with minimal water pressure, the metering effect inside the drip irrigation tube is minimal. With higher pressure the metering effect is correspondingly increased. It can thereby be achieved that the amount of water emerging out of the metering element 1 through the outlet opening 14 is practically unchanged, independently of the water pressure inside the drip irrigation tube 2, and an even irrigation of plants is thereby obtained regardless of whether these plants are located in the beginning region of the drip irrigation tube or at its end region.

In FIGS. 5 to 8 a second embodiment of a metering element 1 can be seen which is inserted in a known way in a drip irrigation tube 2 and is connected to its walling 3. This metering element 1 likewise has an inlet region 4 with filters 5 disposed therein through which the water is able to flow into the metering region 6 of the metering element 1, which metering region 6 is again formed by a labyrinth channel 7 which is composed of two lateral walls 8 and 9. The water emerges out of the labyrinth channel 7 into the outlet region 13, which surrounds the two lateral walls 8 and 9 and the end of the labyrinth channel 7 completely. Out of the outlet region 13 the water can again escape dropwise through the outlet opening 14.

Figure 6:
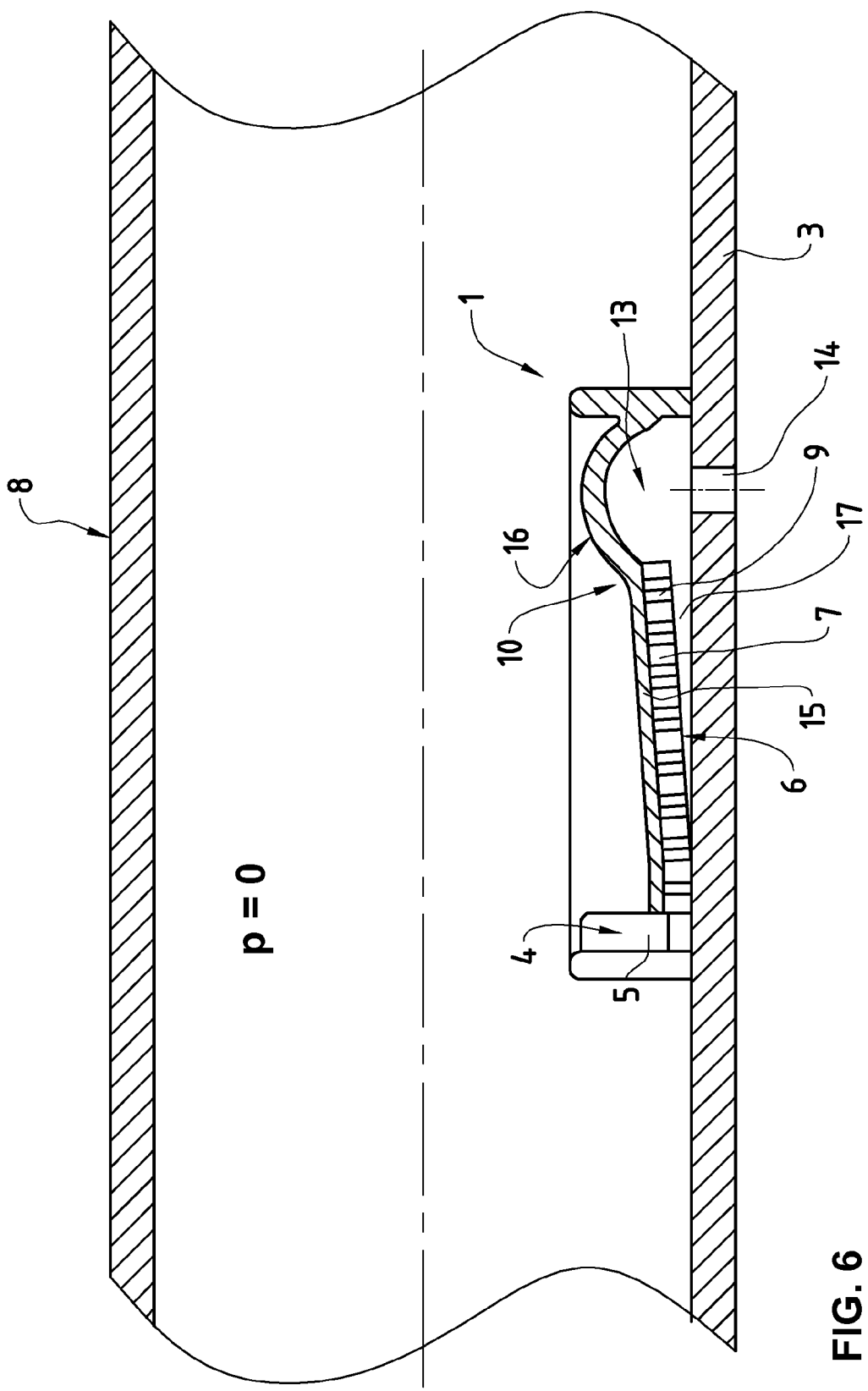
FIG. 6 to FIG. 8 are each sectional representations along line VI-VI of FIG. 5 of the second embodiment of the metering element according to FIG. 5, with in each case differing water pressure inside of the drip irrigation tube.
Figure 7:
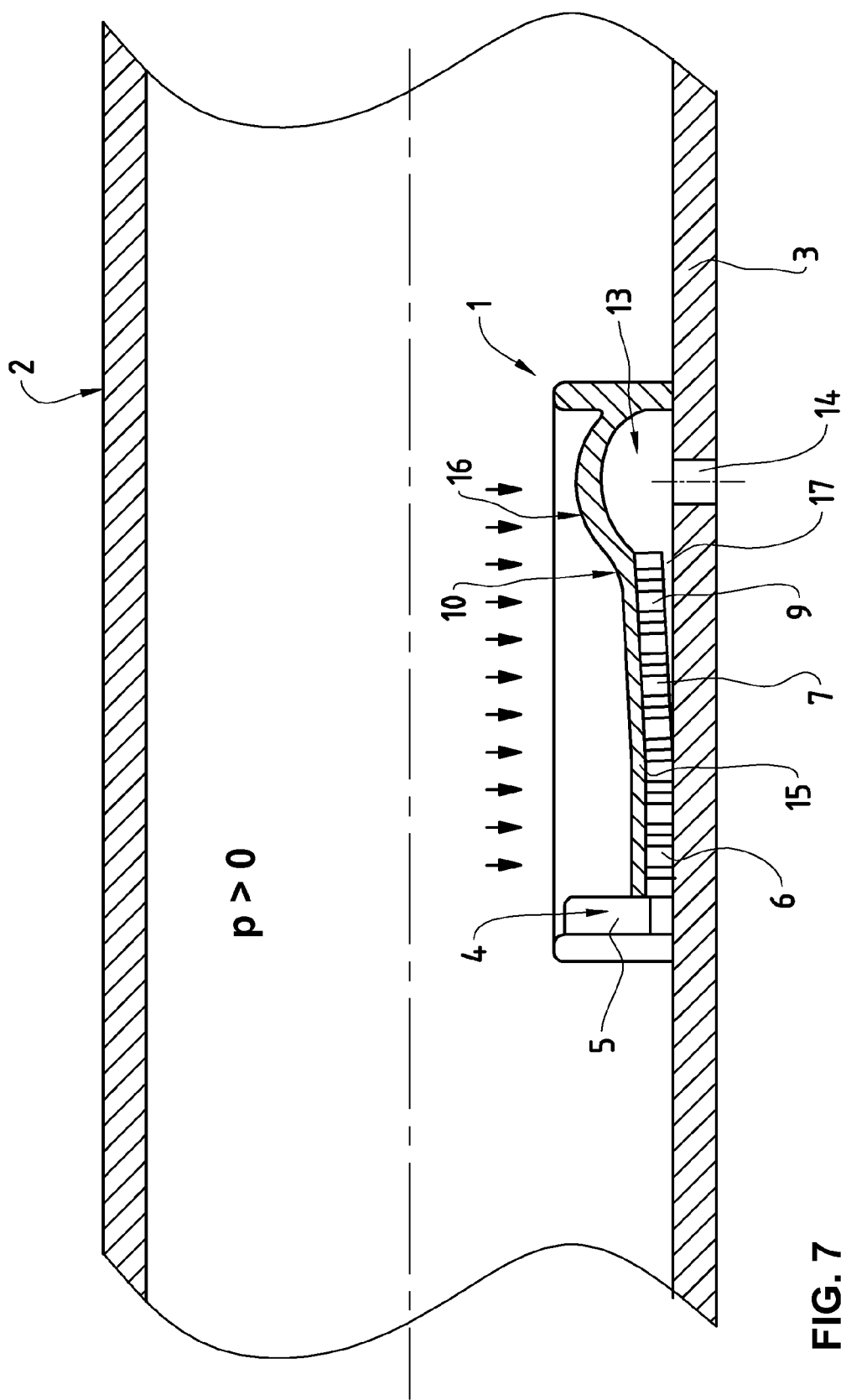
Figure 8:
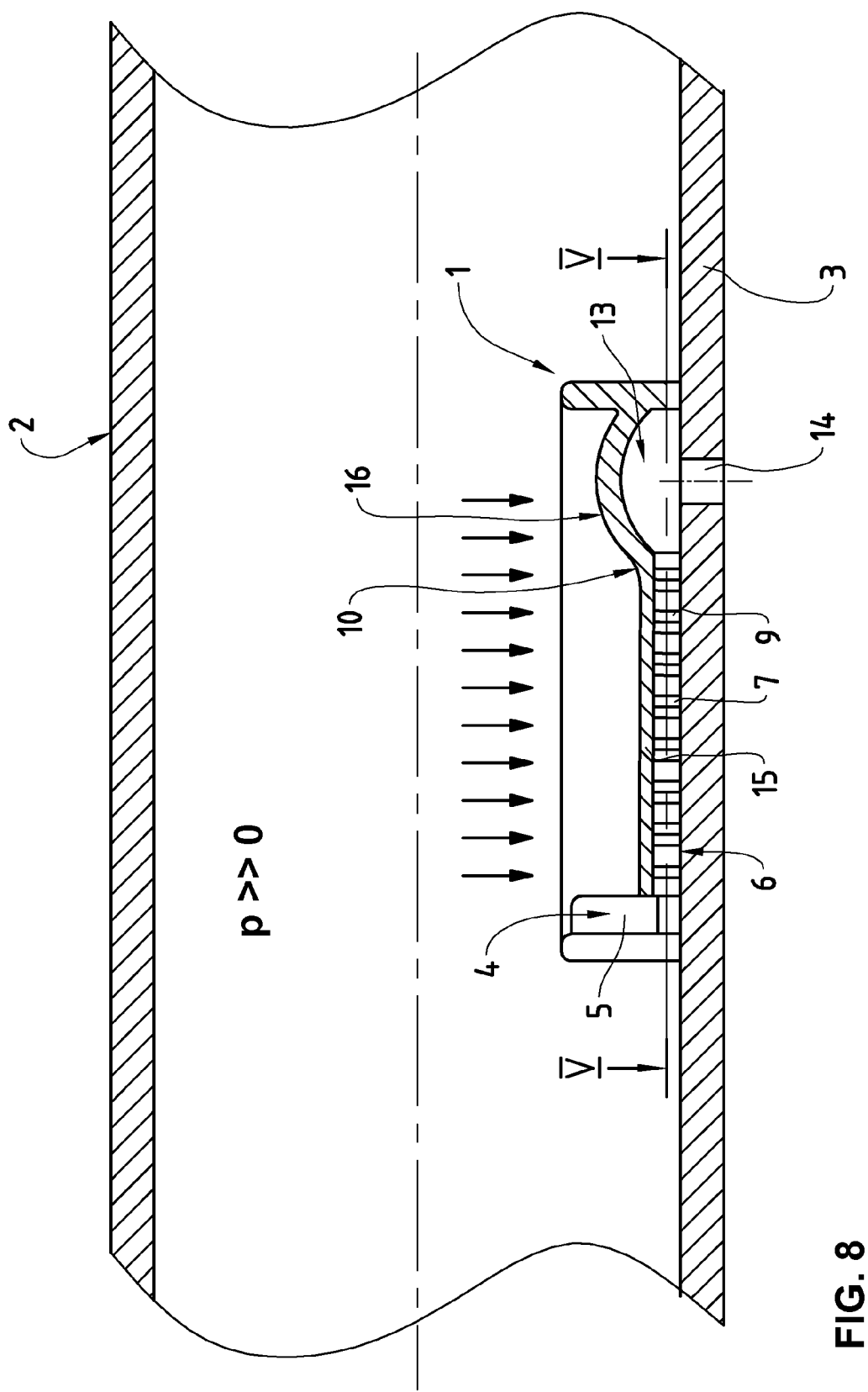
Figure 9:
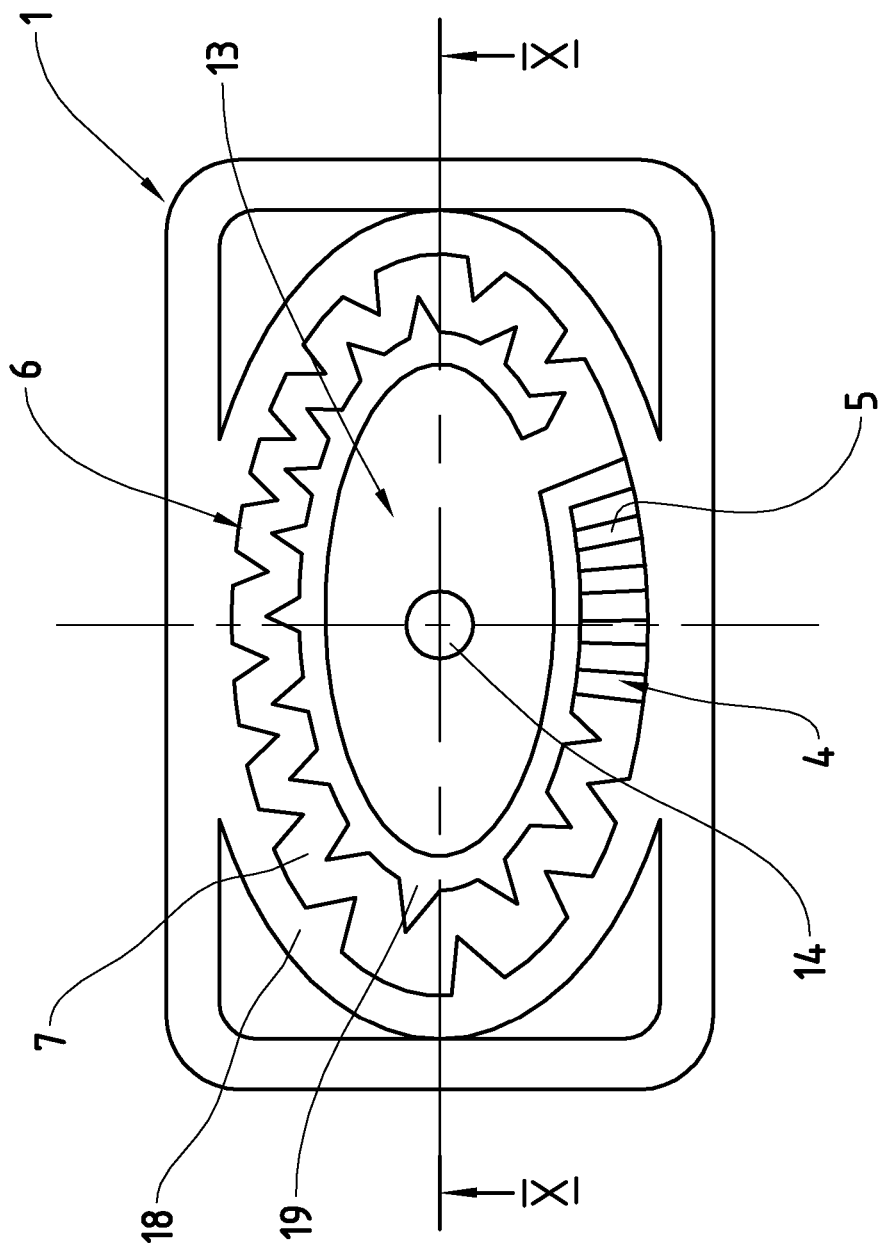
FIG. 9 is a sectional representation along line IX-IX of FIG. 12 of a third embodiment of a metering element of the facility according to the invention.

As can be seen from FIGS. 6 to 8, the cover 10 of this metering element again consists of an elastic membrane 15 which covers the metering region 6, the lateral walls 8 and 9 and the entire outlet region 13. The two regions of the lateral walls 8 and 9 that are turned toward the elastic membrane 15 are connected to this elastic membrane 15. The regions of the lateral walls 8 and 9 that are turned toward the walling 3 of the drip irrigation tube 2 are not connected to the walling 3. The elastic membrane 15 is elastically pretensioned in such a way that it has a curve directed toward the inside of the drip irrigation tube 2 when the pressure of the water in the drip irrigation tube 2 equals zero, as can be seen from FIG. 6. The two lateral walls 8 and 9, which are connected with the elastic membrane 15, are lifted up from the walling 3 of the drip irrigation tube 2. Through this lifting up, a passage 17 is created between labyrinth channel 7 and outlet region 13 which passage increases from the inlet region 4 to the end of the labyrinth channel 7 remote from the inlet region 4.

When the water pressure inside the drip irrigation tube 2 increases, the elastic membrane 15 is pressed against the walling 3 of the drip irrigation tube 2, as can be seen from FIG. 7. In the area adjacent the inlet region 4 the lateral walls 8 and 9 of the labyrinth channel 7 are completely pressed against the walling 3. The region of the lateral walls 8 and 9 remote from the inlet region 4 are still lifted off of the walling 3 so that here a passage 17 continues to be created. The water entering the labyrinth channel 7 out of the inlet region 4 flows through the part of the labyrinth channel 7 in which the lateral walls 8 and 9 are pressed against the walling 3. Then the water can exit through the passage 17 directly into the outlet region 13. The water is thereby partially metered and can emerge through the outlet opening 14 and irrigate the corresponding plants.

When the water pressure inside of the drip irrigation tube continues to increase, the elastic membrane 15, is pressed further against the walling 3 of the drip irrigation tube 2, as can be seen from FIG. 8, so that the two lateral walls 8 and 9 forming the labyrinth channel 7 are pressed against the walling 3 over their entire length and no water can thereby escape laterally out of the labyrinth channel 7. The water thus flows through the entire length of the labyrinth channel 7, is correspondingly greatly metered and can then emerge through the outlet opening 14 for irrigation of the corresponding plants.

Thus also with this embodiment of the metering element the water is metered in a way depending upon the water pressure inside of the drip irrigation tube, so that substantially a uniform irrigation is achieved over the entire length of the drip irrigation tube 2.

A third embodiment of a metering element 1 inserted in drip irrigation tube 2 and connected to its walling 3 is illustrated in FIGS. 9 to 12. This metering element 1 again has an inlet region 4 through which the water can enter a labyrinth channel 7. The labyrinth channel 7 surrounds the outlet region 13 in an annular way. It is formed by an outer lateral wall 18 and an inner lateral wall 19. Through the labyrinth channel 7 the water reaches the outlet region 13, which is again provided with an outlet opening 14 in order to enable a metered exit of the water out of the drip irrigation tube.

The outer lateral wall 18 and the inner lateral wall 19, the labyrinth channel 7 as well as the outlet region 13 are covered by an elastic membrane 15. The outer lateral wall 18 and the inner lateral wall 19 are connected to the elastic membrane 15. The outer lateral wall 18 is also connected to the walling 3 of the drip irrigation tube 2. The inner lateral wall 19 is not connected to the walling 3 of the drip irrigation tube 2.

Figure 10:
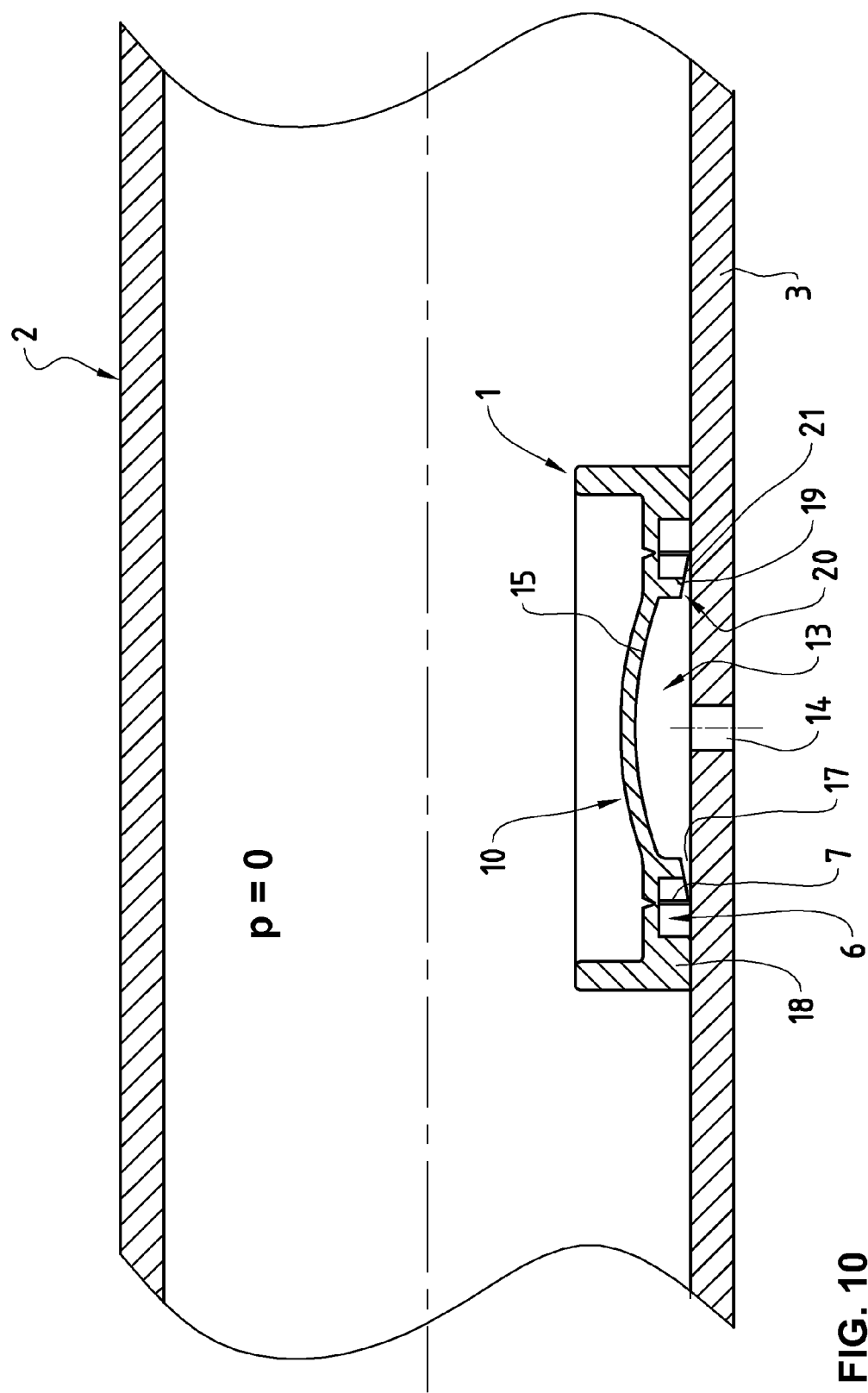
FIG. 10 to FIG. 12 are each a sectional representation along line X-X of FIG. 9 of the third embodiment of the metering element according to FIG. 9 with in each case differing water pressure inside the drip irrigation tube.

As can be seen from FIG. 10, the elastic membrane 15 is pretensioned in such a way that it is curved toward the inside of the drip irrigation tube 2 when the water pressure in this drip irrigation tube 2 equals zero. By means of this curvature, as can be seen from FIG. 10, the inner lateral wall 19 is lifted up from the walling 3 of the drip irrigation tube 2. There thus arises a passage 17 between the inner lateral wall 19 and the walling 3 of the drip irrigation tube. The surface 20 directed toward the walling 3 of the drip irrigation tube 2 can be provided with an inclination 21 directed toward the outlet region 13. The passage 17 is thereby enlarged when the water pressure inside of the drip irrigation tube 2 equals zero.

Figure 11:
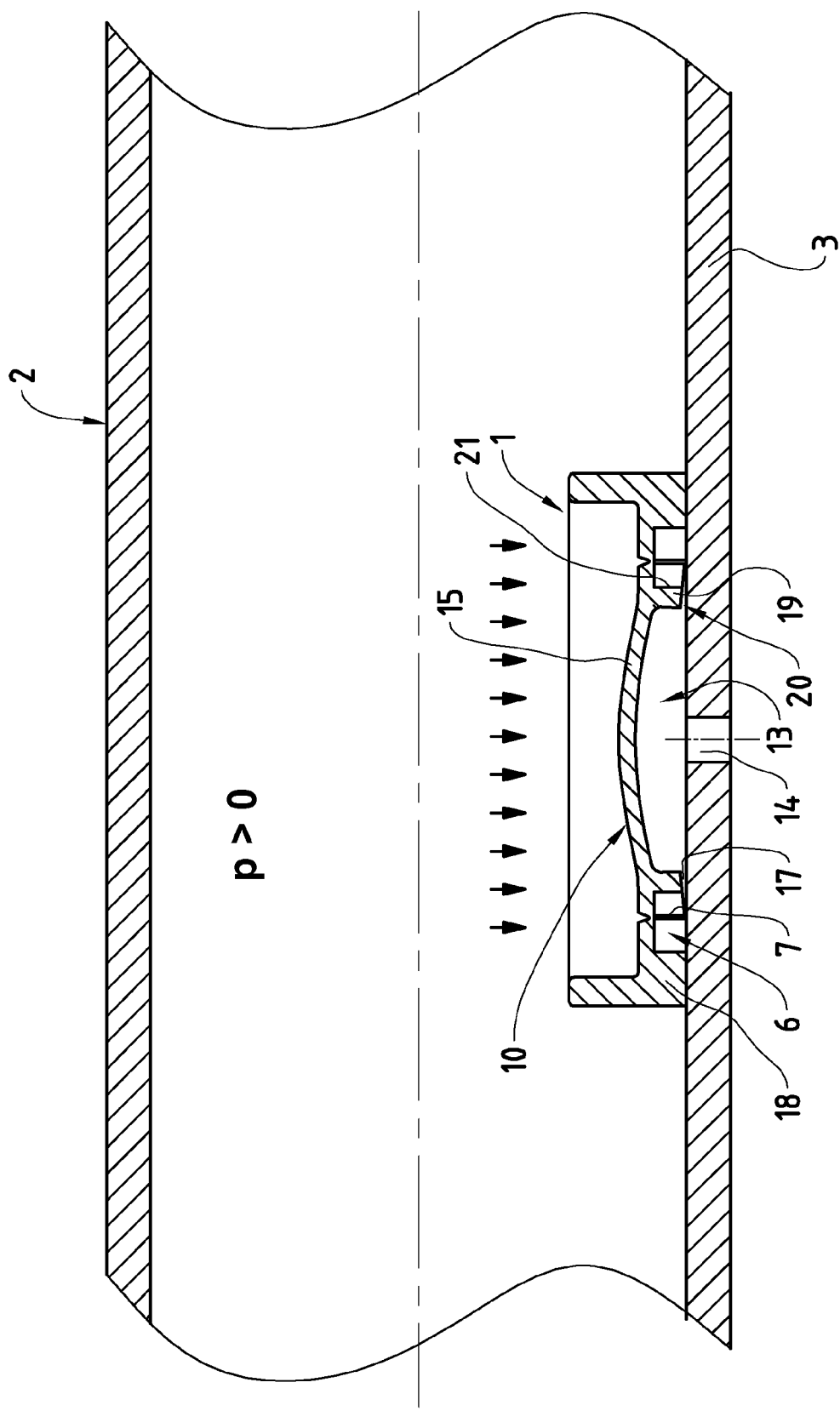

With increase of the water pressure inside of the drip irrigation tube 2, as is shown in FIG. 11, the elastic membrane 15 is pressed against the walling 3 of the drip irrigation tube 2. The inner lateral wall 19 thereby also moves itself toward the walling 3 of the drip irrigation tube 2; the passage 17 becomes smaller, and the water reaching the outlet region 13 is thereby partially metered.

Figure 12:
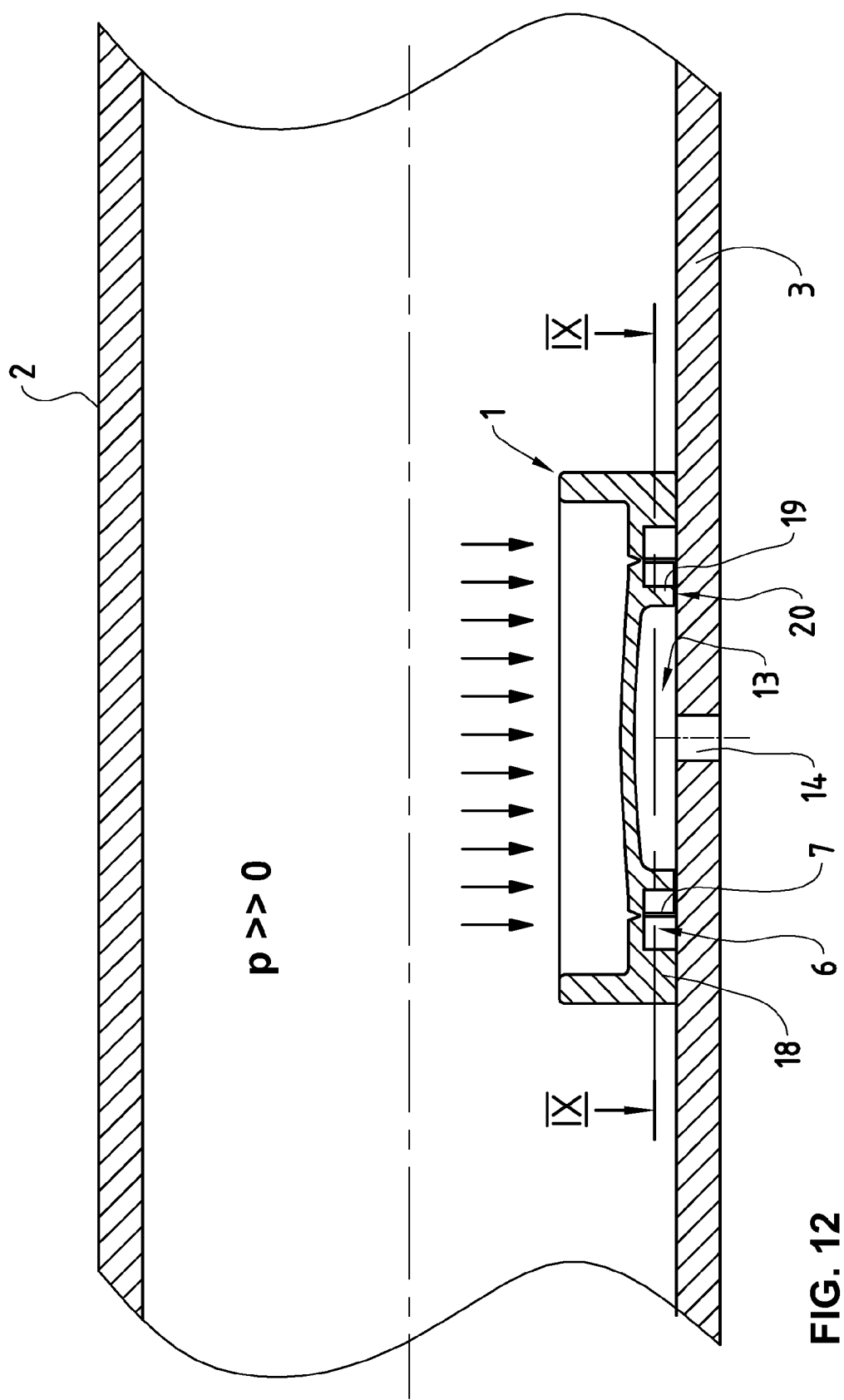
Figure 13:
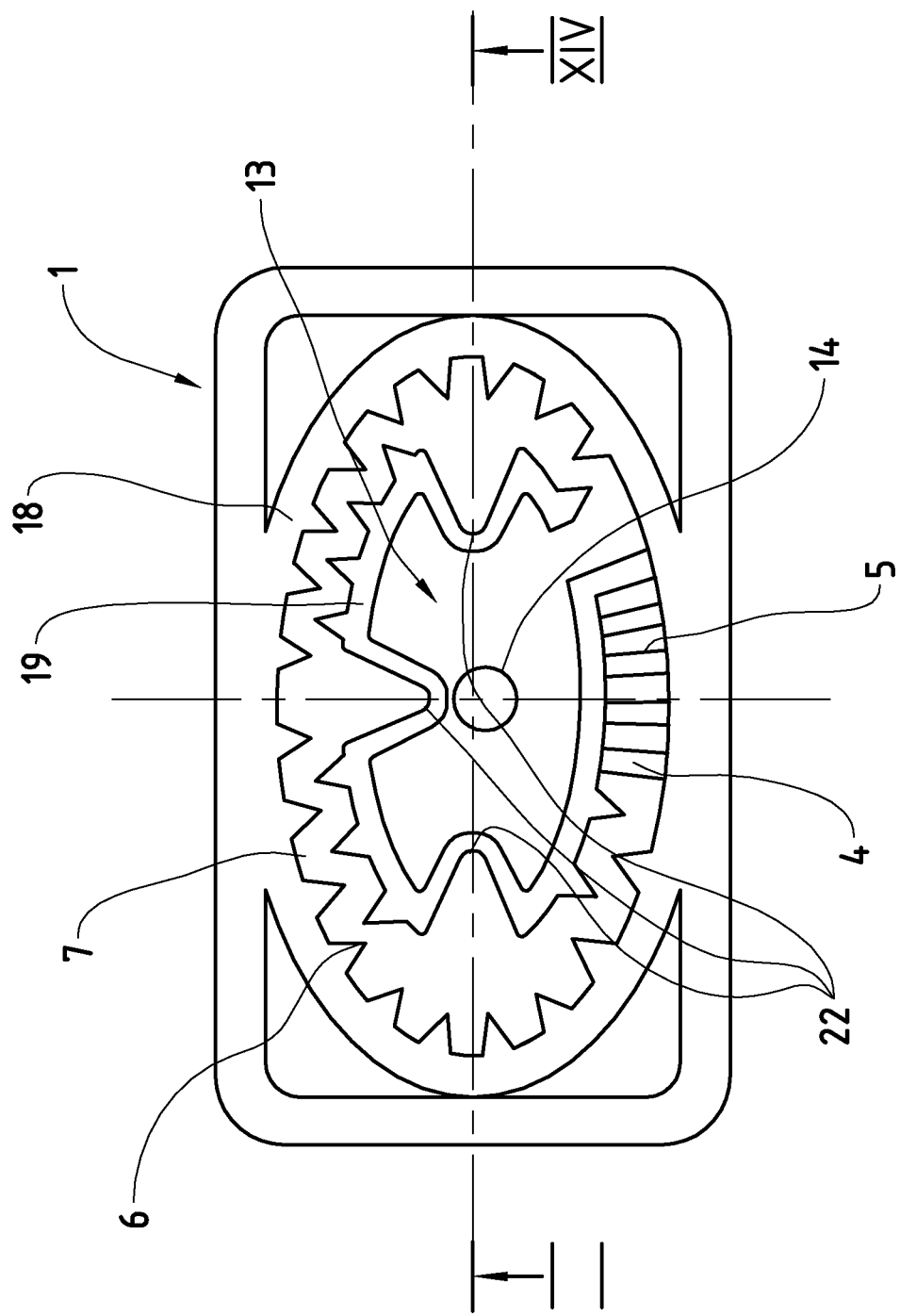
FIG. 13 is a sectional representation along line XIII-XIII of FIG. 16 of a fourth embodiment of a metering element of the facility according to the invention.

When the water pressure inside of the drip irrigation tube 2 increases further, as is shown in FIG. 12, the elastic membrane 15 moves farther toward the walling 3 of the drip irrigation tube 2, until the inner lateral wall 19 with its surface 20 comes completely in contact with the walling 3. This means that the water arriving in the labyrinth channel 7 through the inlet region 4 has to flow through the entire length of the labyrinth channel 7. Thus a maximal metering of the water takes place.

Thus also with this third embodiment of a metering element a practically unchanged metering of the water is achieved over the entire length of a drip irrigation tube 2, whereby an optimal irrigation of the plants is achieved.

The fourth embodiment of a metering element 1 shown in FIGS. 13 to 16, which can be inserted in drip irrigation tubes 2 and connected to the walling 3, has, like the third embodiment, an inlet region 4 which is provided with filters 5, out of which region the entering water arrives in the labyrinth channel 7, which channel is disposed in an annular way around the outlet region 13. The outer lateral wall 18 is connected to the walling 3 of the drip irrigation tube 2. The inner lateral wall 19 has protrusions 22 distributed over its entire length. The metering element 1 is again covered with an elastic membrane 15. The outer lateral wall 18, the inner lateral wall 19 and the protrusions 22 are connected to this elastic membrane 15. The outer lateral wall 18 and the inner lateral wall 19 are also connected to the walling 3 of the drip irrigation tube 2. The protrusions are not connected to the walling 3.

Figure 14:
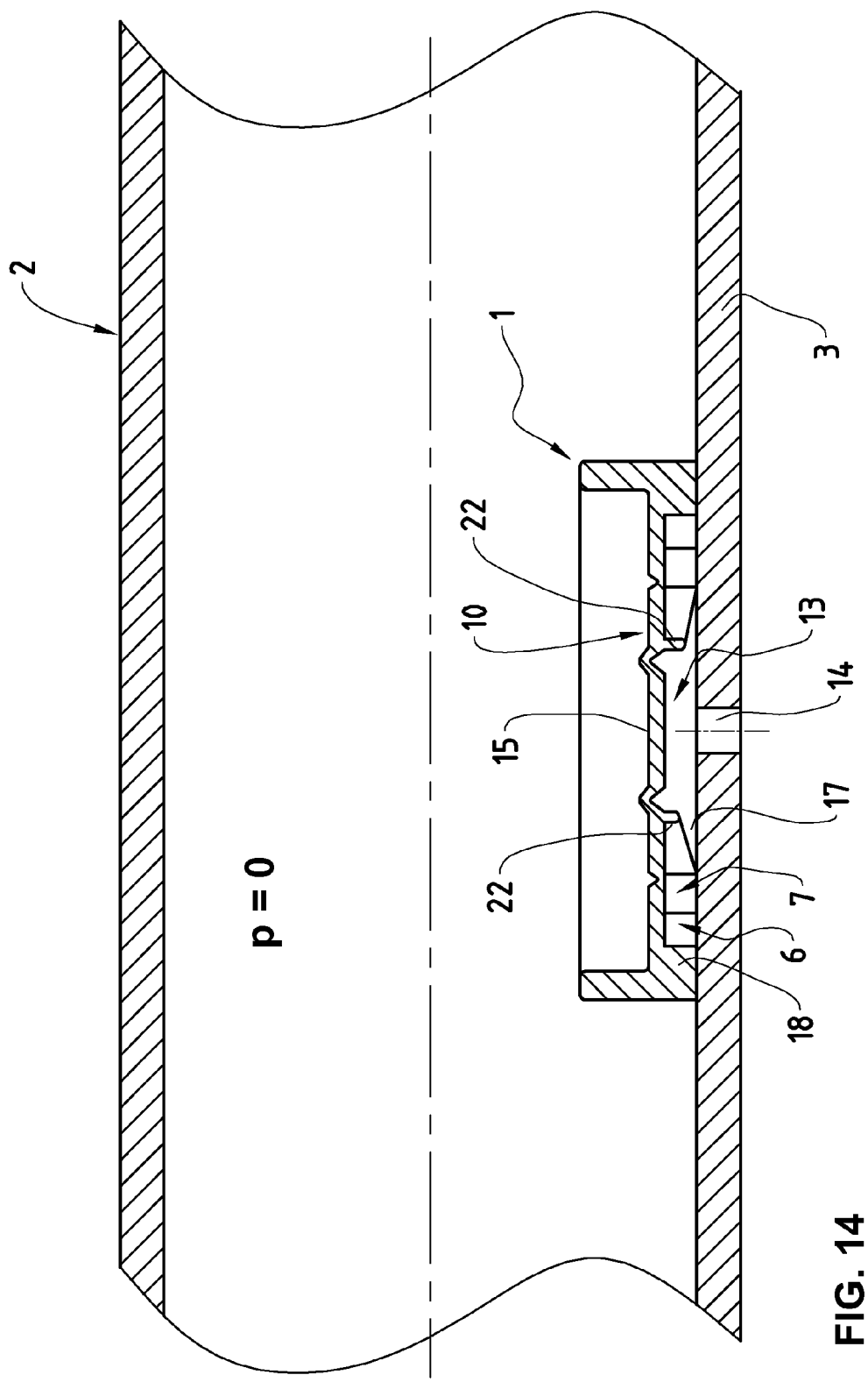
FIG. 14 to FIG. 16 are each sectional representations along line XIV-XIV of FIG. 13 of the fourth embodiment of the metering element according to FIG. 13, with in each case differing water pressure inside the drip irrigation tube.

As can be seen from FIG. 14, the elastic membrane 15 is pretensioned in such a way that, when the water pressure inside of the drip irrigation tube 2 is zero, the protrusions 22 directed toward the outlet region 13 are lifted up from the walling 3. For this purpose the height of the protrusions 22 decreases from the inner lateral wall 19 toward the outlet region 13. The water can thus flow away into the outlet region over the protrusions 22.

Figure 15:
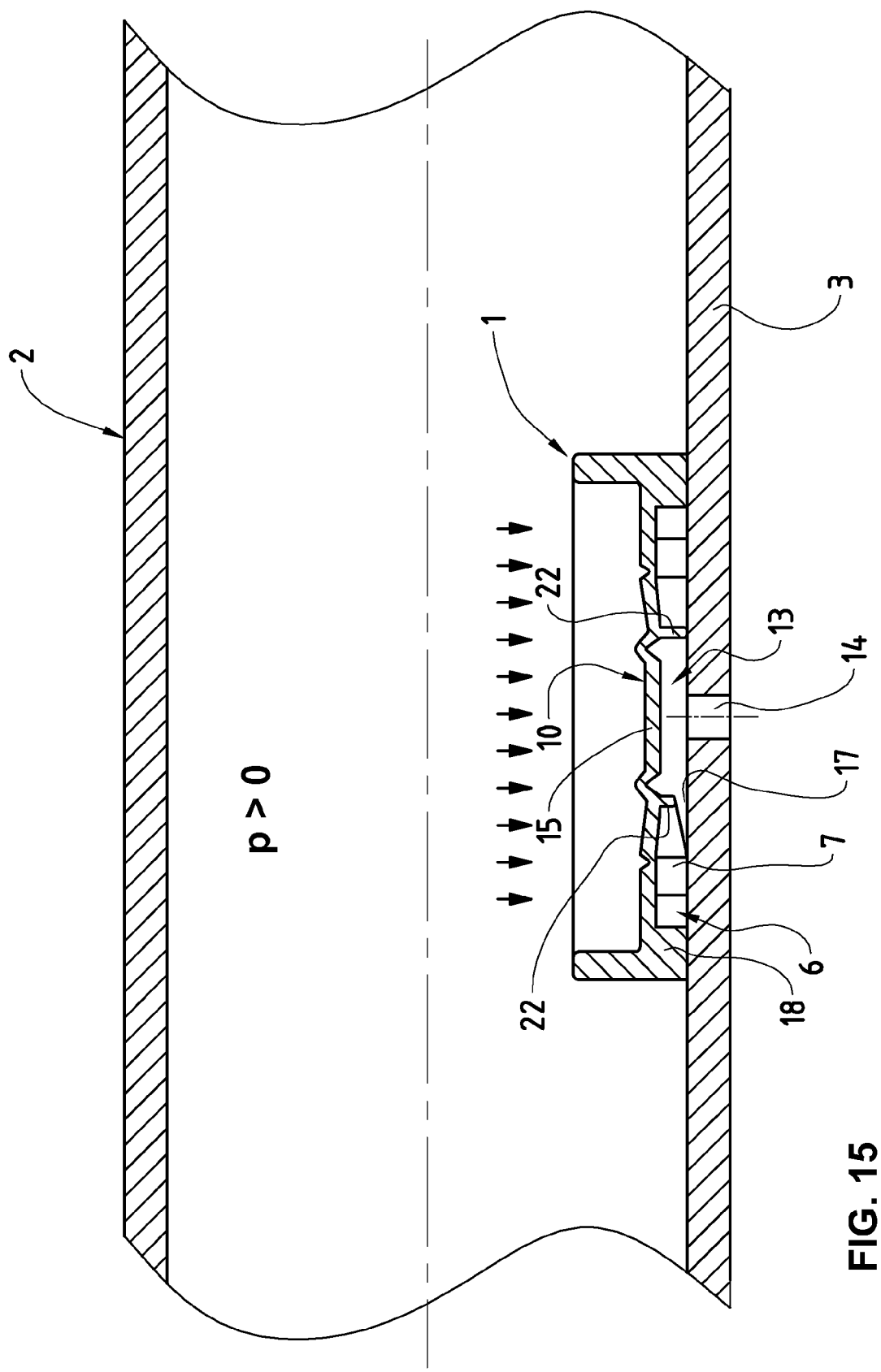
Figure 16:
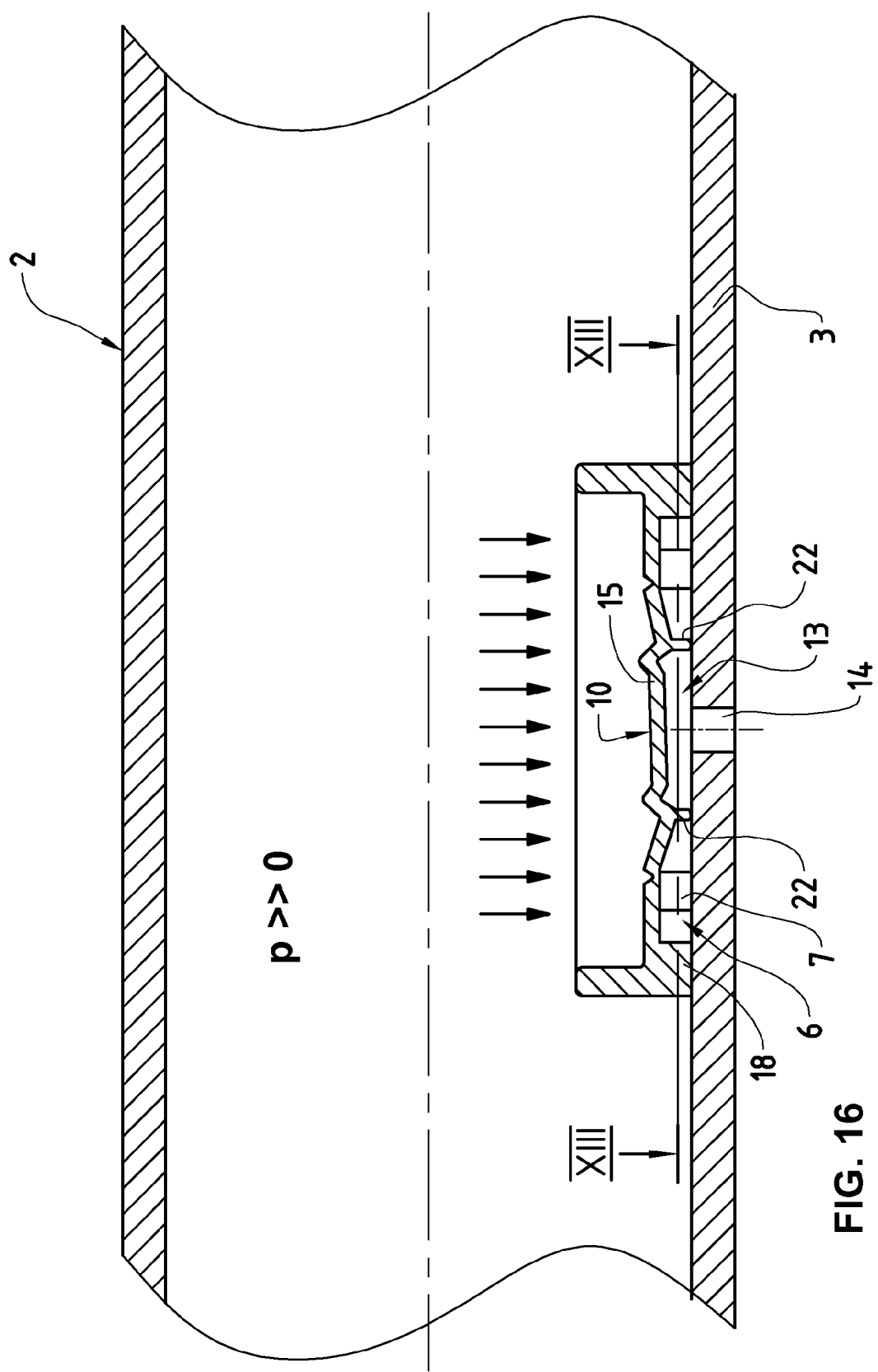

When the water pressure inside of the drip irrigation tube 2 increases, as can be seen from FIG. 15, the elastic membrane 15 is pressed toward the walling 3 of the drip irrigation tube 2. This means that the protrusions 22 are lowered toward the walling 3; the passage 17 through which the water can flow into the outlet region 13 out of the labyrinth channel 7 becomes smaller. A portion of the water can thus escape out of the labyrinth channel 7 directly through these passages, while the remaining portion of the water has to flow through the labyrinth channel 7. A partial metering of the water flowing through the metering element 1 is thereby achieved.

When the water pressure inside of the drip irrigation tube 2 increases further, the elastic membrane 15 is pressed further toward the walling 3 of the drip irrigation tube 2. The protrusions come to abut the walling 3 of the drip irrigation tube completely, so that no water can escape anymore into the outlet region 13 from these protrusions 22. Thus the water must flow through the entire length of the labyrinth channel 7 and is correspondingly greatly metered.

The heights of the protrusions 22 can differ. The protrusion closest to the inlet region 4 can have the greatest height. The protrusion 22 which has the largest distance from the inlet region 4 can have the most minimal height. Achieved in this way is that the effective length of the labyrinth channel 7 grows with increasing water pressure inside of the drip irrigation tube 2.

Achieved also with this fourth embodiment of a metering element is that, through the adjusted metering, at every metering element 1 over the entire length of a drip irrigation tube 2 a practically equal quantity of water exits out of the outlet opening 14 for irrigation of the plants.

Achieved with the present invention is that the irrigation of plants takes place in the same way over the entire length of drip irrigation tubes.

The metering elements described in the foregoing are made of a single material, in particular an elastomer which can take place by punching or another suitable production process.

What is claimed is:

1. A drip irrigation system, comprising:
a drip irrigation tube comprising a tube wall; and
multiple metering elements inserted in the drip irrigation tube, wherein each of the metering elements is connected to the tube wall of the drip irrigation tube, and wherein each of the metering elements comprises:
an inlet region, through which water from the drip irrigation tube arrives in the metering element;
a metering region, comprising a labyrinth channel having a discharge cross section that is not reduced, the labyrinth channel delimited by two lateral walls, a cover and the tube wall of the drip irrigation tube and in which a pressure reduction of water flowing through takes place; and
an outlet region, through which water emerges out of the drip irrigation tube via an outlet opening in the tube wall, wherein the outlet region borders on at least one of the two lateral walls of the labyrinth channel, wherein at least one region of the two lateral walls is covered by and connected to an elastic membrane forming a portion of the cover, and wherein the two lateral walls are configured to be lifted off of the tube wall by lifting the elastic membrane, thus forming a passage through which water from the labyrinth channel reaches the outlet region directly.

2. The drip irrigation system of claim 1, further comprising a filter in the inlet region.

3. The drip irrigation system of claim 1, wherein the metering elements are made of one material, comprising an elastomer.

4. The drip irrigation system of claim 1, further comprising projections and depressions on the two lateral walls that form the labyrinth channel.

5. The drip irrigation system of claim 1, wherein the two lateral walls extend from the inlet region over at least a portion of a length of the elastic membrane.

6. The drip irrigation system of claim 1, wherein the two lateral walls extend from the inlet region over an entire length of the elastic membrane.

7. The drip irrigation system of claim 1, wherein the labyrinth channel is disposed around the outlet region, and wherein the two lateral walls comprise an outer lateral wall and an inner lateral wall.

8. The drip irrigation system of claim 7, wherein the outer lateral wall of the labyrinth channel is connected to the tube wall and to the elastic membrane, and wherein the inner lateral wall is connected to the elastic membrane and is able to be lifted off of the tube wall.

9. The drip irrigation system of claim 7, wherein a surface of the inner lateral wall directed toward the tube wall has an inclination toward the outlet region.

10. A drip irrigation system, comprising:
a drip irrigation tube comprising a tube wall; and
multiple metering elements inserted in the drip irrigation tube, wherein each of the metering elements is connected to the tube wall of the drip irrigation tube, and wherein each of the metering elements comprises:
an inlet region, through which water from the drip irrigation tube arrives in the metering element;
a metering region, comprising a labyrinth channel, which is delimited by an outer lateral wall and an inner lateral wall, a cover and the tube wall of the drip irrigation tube and in which a pressure reduction of water flowing through takes place; and
an outlet region, through which water emerges out of the drip irrigation tube via an outlet opening in the tube wall,
wherein the labyrinth channel is disposed around the outlet region,
wherein at least one region of the outer lateral wall is connected to the tube wall and is covered by and connected to an elastic membrane forming a portion of the cover,
wherein the inner lateral wall is connected to the elastic membrane and is provided with protrusions protruding into the outlet region, said protrusions disposed in a distributed way over a length of the inner lateral wall, and
wherein the two lateral walls are configured to be lifted off of the tube wall by lifting the elastic membrane, thus forming a passage through which water from the labyrinth channel reaches the outlet region directly.

11. The drip irrigation system of claim 10, wherein the protrusions have different heights, and wherein the different heights decrease from the inlet region toward an end of the labyrinth channel.

* * * * *